United States Patent [19]

Yoshida

[11] Patent Number: 4,777,593
[45] Date of Patent: Oct. 11, 1988

[54] VECTOR PROCESSING APPARATUS INCLUDING MEANS FOR IDENTIFYING THE OCCURRENCE OF EXCEPTIONS IN THE PROCESSING OF VECTOR ELEMENTS

[75] Inventor: Yaoko Yoshida, Tokyo, Japan
[73] Assignee: Hitachi, Ltd., Tokyo, Japan
[21] Appl. No.: 685,112
[22] Filed: Dec. 21, 1984

[30] Foreign Application Priority Data

Dec. 26, 1983 [JP] Japan ................ 58-243943

[51] Int. Cl.[4] ................ G06F 11/28; G06F 9/38
[52] U.S. Cl. ........................ 364/200; 364/736; 364/730
[58] Field of Search ... 364/200 MS File, 900 MS File, 364/736, 730, 736

[56] References Cited

U.S. PATENT DOCUMENTS

| | | | |
|---|---|---|---|
| 4,025,771 | 5/1977 | Lynch, Jr. et al. | 235/156 |
| 4,101,960 | 7/1978 | Stokes et al. | 364/200 |
| 4,270,181 | 5/1981 | Tanakura et al. | 364/736 |
| 4,298,936 | 11/1981 | Shapiro | 364/200 |
| 4,302,818 | 11/1981 | Niemann | 364/736 |
| 4,338,675 | 7/1982 | Palmer et al. | 364/748 |
| 4,525,796 | 6/1985 | Omoda et al. | 364/730 |

Primary Examiner—Gareth D. Shaw
Assistant Examiner—Christina M. Eakman
Attorney, Agent, or Firm—Antonelli, Terry & Wands

[57] ABSTRACT

A vector processing apparatus has a number of pipeline arithmetic units operating concurrently to execute a set of vector instructions dealing with vector elements. Stack registers are provided for each arithmetic unit to hold the vector instruction address, leading vector element position and vector register internal address, so that one of the exceptions that can be detected successively by several arithmetic units during the process of the vector instructions is selected on a priority basis through the comparison of information in the stack of the currently detected exception with information of exception detected previously.

5 Claims, 5 Drawing Sheets

① VL    VR0 , VAR0 , VIR0
② VL    VR2 , VAR2 , VIR2
③ VEA   VR4 , VR0 , VR2
④ VST   VR4 , VAR4 , VIR4
⑤ VEND

VECTOR PROCESSING APPARATUS INCLUDING MEANS FOR IDENTIFYING THE OCCURRENCE OF EXCEPTIONS IN THE PROCESSING OF VECTOR ELEMENTS

The present invention relates to a vector processing apparatus having a plurality of functional facilities capable of operating concurrently and intended to process vectors having a larger number of elements than the vector register can store.

There has been proposed a vector processing apparatus having a plurality of vector registers, vector arithmetic units and memory requesters for fetching or storing vector data, and capable of fast vector processing through the concurrent operation of these facilities.

Such a vector processing apparatus has vector instructions, each for processing a number of vector elements in the single execution. An example of such vector instructions is the vector addition instruction which adds corresponding elements of vector A(i) and vector B(i). In some cases in executing the vector addition instruction, an overflow exception, for example, is detected for more than one of the vector elements. Exceptions which can be detected for each element during the execution of a vector instruction include arithmetic exceptions, such as an underflow exception, a division exception and a significance exception, and access exceptions, such as an address exception, a address translation exception and a memory protection exception. When such exception is detected, it is not sufficient to simply notify the software of the type of exception and the instruction address at which the exception has occurred, but it is further necessary to indicate the position of the vector element which has caused the exception.

However, where a plurality of vector instructions are executed concurrently in the vector processor, a plurality of exceptions may be detected simultaneously. Furthermore, the execution of instructions does not always occur in the order of the instruction address, i.e., an exception of a vector instruction having an earlier instruction address may be detected later than exception of a vector instruction having a later instruction address. It would require a complicated process to determine which vector instruction has produced each exception and to perform an interrupt process for such vector instruction, resulting possibly in a degraded overall performance of the apparatus.

It is an object of the present invention to provide a vector processing apparatus which can readily determine the exception that has occurred first conceptually in dealing with vector elements, without impairing the performance of vector instruction execution.

In a typical form of the invention, each pipeline arithmetic unit is provided with a stack for the leading vector element number, a stack for the vector instruction address and an address counter for the internal use of the vector register, and upon detection of an exception by the arithmetic unit, information held in the stack and counter is read out. This information is used to generate the vector element number of the element for which exception has been detected, and the vector element number and instruction address of a newly detected exception are compared with those already held so as to select information of the exception to be held ultimately, thereby enabling the determination of the exception which has occurred first in dealing with vector elements.

FIG. 2b shows a list of vector instructions corresponding to the program show in FIG. 2a;

Figure 1:
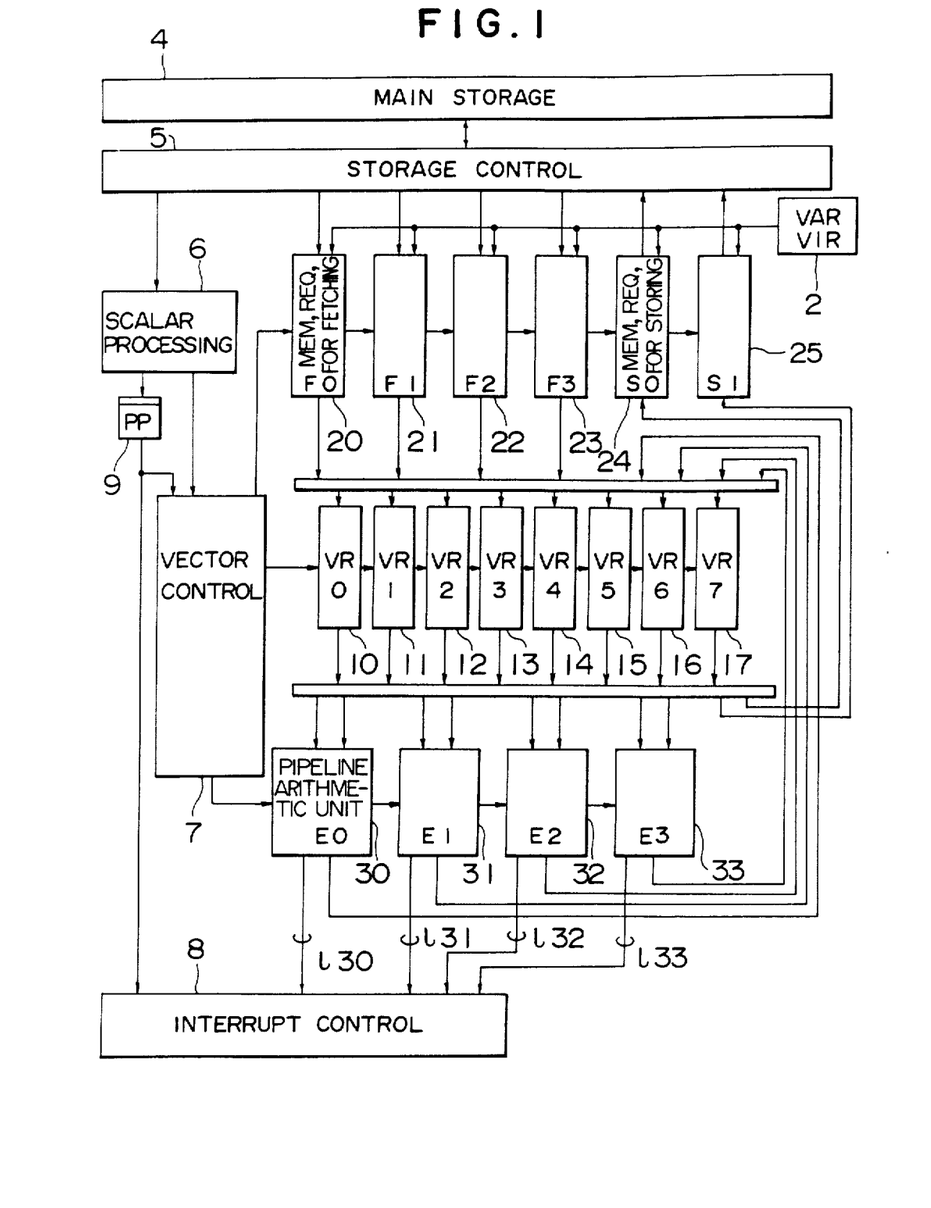
FIG. 1 is a general block diagram showing the vector processing apparatus embodying the present invention.

An embodiment of the present invention will now be described with reference to the drawings. In FIG. 1 showing the general arrangement of the inventive vector processing apparatus, when the instruction for commencing the processing of vector instructions is read out of the main storage 4 through the storage control unit 5 to the scalar processing unit 6, the unit 6 activates the vector processing controller 7 with the indication of the vector instruction starting address, the number of elements of vector processing, and the mode of processing (parallel or single). The vector processing controller 7 reads a vector instruction in the storage 4 according to the starting address indicated, analyzes the instruction, and then designates the vector registers (VR0-VR7) 10–17, memory requesters for fetching vector data (F0-F3) 20–23, memory requesters for storing vector data (S0, S1) 24 and 25, or pipeline arithmetic units (E0-E3) 30–33, depending on the result of analysis, for the execution of the vector instruction. The fetching memory requesters F0-F3 calculate the vector data address in the main storage using the vector address register 2 and read out vector data in the main storage 4 via the storage control unit 5, and operate to transfer the vector data to the vector registers VR0-VR7. Each of the vector registers VR0-VR7 can latch vector elements of TMAX in number, and can read and write simultaneously. The pipeline arithmetic units E0-E3 perform arithmetic operations for vector data in the vector registers VR0-VR7, and apply the results to the vector registers.

The storing memory requesters S0 and S2 calculate the vector data address in the main storage using the vector address register 2, and transfer vector data in the vector registers VR0-VR7 via the storage control unit 5 to the main storage 4. All of the fetching memory requesters F0-F3, storing memory requesters S0 and S1, and pipeline arithmetic units E0-E3 can operate concurrently. It is a common practice to control the parallel operations of the memory requesters and pipeline arithmetic units to the extent of retaining the legitimacy of data thereby to speed up the vector processing.

The flag flip-flop 9 is set by the scalar processing unit 6 to indicate the parallel processing mode when operation of the vector processing controller 7 is initiated. When the flip-flop 9 is set to "1", indicating the parallel processing mode, two of the memory requesters and pipeline arithmetic units are paired to execute one vector instruction, and when the flip-flop 9 is reset to "0", one memory requester or pipeline arithmetic unit is used to execute one vector instruction, the latter being called a "single processing mode" as against a "parallel processing mode" for the former.

In a vector processing apparatus, such as this embodiment, where more than one vector instruction may be executed concurrently, many exceptions such as, for example, an operation exception and a specification exception detected during the decoding stage of instruction execution, and access exception detected by the memory requester, and arithmetic exception detected by the arithmetic unit can arise successively. It is rather awkward and less efficient to extract exception information and reexecute the vector instruction by suspending the whole or part of the time of process at the detection of any exception, and provision of an interrupt process for each vector instruction is not always preferable. Instead, another conceivable method is to run an interrupt process for a series of vector instructions. On this account, the interrupt process controller 8 is provided with functions for selecting the highest ranking exception out of the exception signals 130–133 detected by the pipeline arithmetic units E0–E3, exception signals (not shown) detected by the memory requesters F0–F3, S0 and S1, and exception signals (not shown) detected by the instruction decoding unit (not shown), all occurring independently during the process of a series of vector instructions, and for sampling and holding necessary exception information from a sourcing arithmetic unit, memory requester or instruction decoding unit.

Figure 2A:
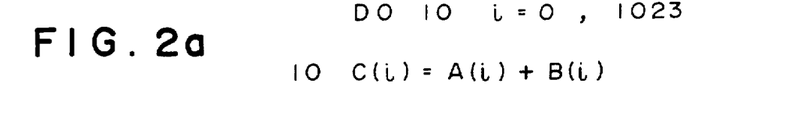
FIG. 2a shows, as an example, the program steps of DO loop in a FORTRAN program.
Figure 2B:
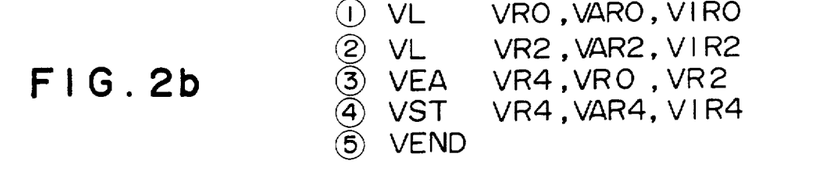

The following describes the process of the vector processing apparatus shown in FIG. 1 dealing with a DO loop of the FORTRAN program shown in FIG. 2a. This DO loop is compiled into vector instructions as shown in FIG. 2b. Instruction 1 is to load vector A(i), i=0–1023 in vector register VR0; instruction 2 is to load vector B(i), i=0–1023 in vector register VR2; and instruction 4 is to store vector C(i), i=0–1023 in vector register VR4. VAR0, VAR2 and VAR4 are registers holding the starting addresses of areas where the vector data is stored, and VIR0, VIR2 and VIR4 are registers holding the interval of areas storing vector elements. In this example, 1024 elements of vector A are stored at an interval of 8 bytes from address 10000, 1024 elements of vector B are stored at an 8-byte interval from address 12000, and 1024 elements of vector C, which is the sum of vectors A and B, are stored at an 8-byte interval from address 14000. Instruction 3 is to add corresponding vector elements loaded in vector registers VR0 and VR2, and store the results in the specified vector register VR4. Instruction 5 is a control instruction which indicates the end of a vector instruction list and does not concern any virtual vector processing operation.

The operation of the apparatus in single processing mode and in parallel processing mode will be described on the assumption that each vector register has a capacity for storing vector elements of VMAX=256. In single processing mode, 1024 sets of vector elements are added through the four repetitive executions of the vector instruction list shown in FIG. 2b. Each execution cycle will be called "one loop". To carry out the cyclic process in a hardware scheme, the vector processing controller 7 is provided therein with a register VLR for holding the number of remaining vector elements to be processed. In case the number of remaining elements is more than 256, 256 sets of vector elements are processed using, for example, the fetching memory requester F0 for the VL instruction in ①, the fetching memory requester F1 for the VL instruction in ②, the arithmetic unit E0 for the VEA instruction in ③, and the storing memory requester S0 for the VST instruction in ④. Accordingly, when the VEND instruction is decoded, the VLR contains the initial value subtracted by 256, the VAR0, VAR2 and VAR4 each contain an initial value added by VIR × 256. If the result of the decrementing of VLR is positive, the process continues from the top of the vector instruction list using the updated, VAR0, VAR2 and VAR4, or if the result becomes negative, the termination process takes place.

In the parallel processing mode, 1024 sets of vector elements are added through the two repetitive executions of the vector instruction list shown in FIG. 2b. The reduction in execution cycles is made possible through the use of two vector registers, two pipeline arithmetic units and two memory requesters in pairs as determined from each vector instruction, which allows 512 sets of vector elements to be processed in one loop. In this mode, the VL instruction in ① transfers 256 vector data A(0), A(2), ..., A(510) to the vector register VR0 using, for example, the fetching memory requester F0, and 256 vector data A(1), A(3) ..., A(511) to the vector register VR1 using the fetching memory requester F1. Subsequently, the VL instruction in ② loads even-numbered elements of vector B in the vector register VR2 and odd-numbered elements of vector B in the vector register VR3; the VEA instruction in ③ produces in the vector register VR4 the sum of the contents of the vector registers VR0 and VR2, and in the vector register VR5 the sum of the vector registers VR1 and VR3; and the VST instruction in 4 stores vector data in the vector register VR4 as resultant vector C(0), C(2), ..., C(510), and vector data in the vector register VR5 as resultant vector C(1), C(3), ..., C(511). Thus, 512 sets of vector elements are processed in one loop, and when the VEND instruction is decoded the VLR contains the initial value subtracted by 512 and the VAR contains the initial value added to VIR × 512. The process following the result of subtraction for the VLR is identical to the case of the single processing mode.

In order to provide a single interrupt process for a series of vector instructions as shown in FIG. 2b for the example of a DO loop shown in FIG. 2a, it becomes necessary to select one of the exceptions that may occur in the DO loop shown in FIG. 2a. Among several conceivable priority rules of selection, such as a rule of ranking both operation and specification exceptions higher than an access exception or an arithmetic exception, a rule of providing a higher ranking to an exception related to a vector instruction having an earlier address, a rule of providing a higher ranking to an exception related to the smaller vector element number, and so on, this embodiment adopts the rule of selecting at the higher priority an exception related to the element having the smaller element number and which is, at the same time, related to an instruction having the earlier address. The reason of choosing this priority rule is based on the concept that an exception which would be detected earliest in executing a DO loop using scalar instructions should be selected first.

Figure 3:
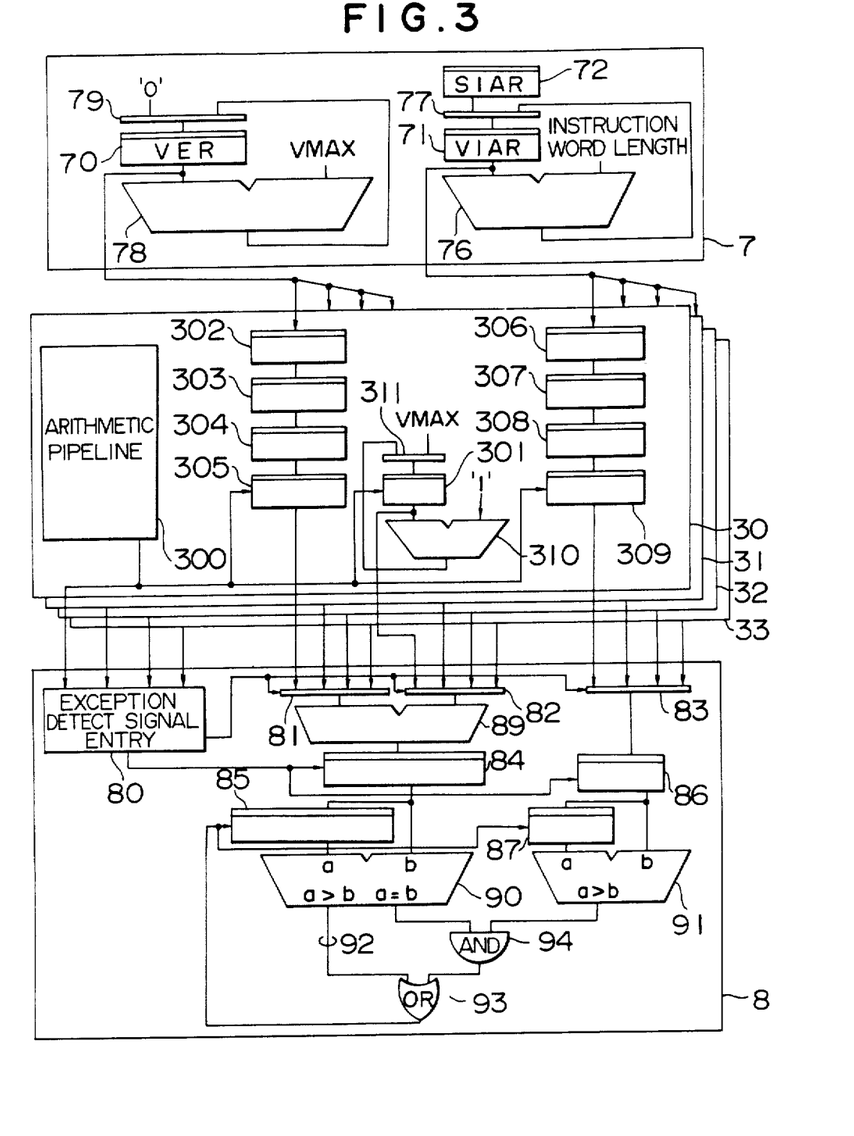
FIG. 3 is a block diagram showing the exception information selecting circuit in a single processing mode.

FIG. 3 shows in a block diagram the exception information selecting circuit 8 designed for operating solely in a single processing mode. All of the memory requesters and pipeline arithmetic units operate to detect exceptions during the execution of a vector instruction.

The arrangement for determining the instruction address and element number at which exception has occurred is shown only with reference to operation of the arithmetic units; however, the same arrangement may be used for the memory requesters, although not shown in the figure.

In FIG. 3, the vector process controller 7 analyzes the vector instruction and assigns a pipeline arithmetic unit or memory requester to the instruction if the decision is reached that the vector register specified by the instruction and a pipeline arithmetic unit or memory requester of the type useful for the instruction are ready for use. The vector process controller 7 is provided therein with a register (SIAR) 72 for holding the address of the leading vector instruction and a register (VIAR) 71 for indicating the address of the current instruction.

The following describes the updating operation of register VIAR. When the vector process controller 7 is activated, the address of the leading vector instruction indicated by the scalar processing unit 6 is set to register SIAR and, then, to register VIAR. Thereafter, the instruction word length is added to the contents register VIAR through the adder 76 and selector 77 in response to the initiation of the vector instruction. When the VEND instruction is decoded, the leading instruction address held in register SIAR is set to register VIAR. Through the above operation, register VIAR becomes to indicate the address of the initiated vector instruction.

The vector process controller 7 is provided therein with a register (VER) 70 which indicates the number of vector elements that have been processed so that the leading vector element number to be processed by the initiated instruction is indicated. The updating operation for register VER is as follows. Register VER is cleared when the vector process controller 7 is activated. Thereafter, each time the VEND instruction is decoded, the vector register length VMAX is added to the contents of register VER through the adder 78 and selector 79. Through this operation, register VER can indicate the leading vector element number.

Next, the operation for obtaining the vector instruction address and vector element number for and exception detected by each pipeline arithmetic unit will be described. Upon initiation of a vector instruction by the vector process controller 7, pipeline arithmetic units 30–33 save the address of the vector instruction in the register 306 and the leading vector element number in the register 302. At initiation of the instruction, the vector register internal address counter 301 in each arithmetic unit is set to VMAX. When the first element of vector data to be processed is entered to the first stage of the arithmetic pipeline 300, the contents of register 302 holding the leading vector element number are copied to register 303, and the contents of register 306 holding the vector instruction address are copied to register 307. Thereafter, as the data is moved to the second and, then, third stage of the arithmetic pipeline 300, the leading vector element number is moved to register 304 and, then, to 305, and the vector instruction address is moved to register 308 and, then, to 309. When the first vector element reaches the third stage, i.e., the last stage, the process for one vector element is completed, and the vector register internal address counter 301 is incremented by one through the adder 310 and selector 311 to become "00". Namely, when the counter 301 containing VMAX is incremented by one, it returns to "00" count, indicating the first element. If an exception has been detected during the arithmetic process, the exception detect signal is issued to the interrupt process controller 8 from the arithmetic pipeline 300, and at the same time the registers 305 and 309 and the vector register internal address counter 301 are disabled from further updating in response to this signal.

The second and following elements are processed in the same way as in the first element, and unless an exception is detected, the vector register internal address counter 301 is incremented through the adder 310 and selector each time the process for an element completed. The purpose of saving the leading vector element number and vector instruction address in each stage of the arithmetic pipeline 300 is to retain the distinction among vector instructions existing concurrently within the arithmetic pipeline 300. For an apparatus of different design where two or more instruction do not exist concurrently in the arithmetic pipeline 300, these registers need not be provided for each stage separately.

Through the above operation, the pipeline arithmetic units 30–33 can find the vector instruction address in the register 309 and the vector element number in the registers 305 and 301 for the first exception which has been detected. Since the vector process controller 7 initiates vector instructions in the order of their address and the pipeline arithmetic units 30–33 perform processing in the ascending order of element number, the exception which is detected first by the arithmetic unit will be one with the smallest element number and earliest address out of all exceptions which can be detected by the pipeline arithmetic units 30–33.

The following describes the operation of the interrupt process controller 8 for selecting an exception with the smallest element number and earliest address out of those exception events indicated successively by a number of pipeline arithmetic units. In response to exception detect signals issued by the arithmetic units 30-33, the exception detect signal entry 80 in the interrupt process controller 8 takes one of the detect signals selectively so that a set of exception information is introduced to the interrupt process controller 8. Namely, the vector instruction address is set through the selector 83 into the register 86, the leading vector element number and vector register address are selected by the selectors 81 and 82, respectively, and added together by the adder 89 and set into the exception element number register 84. In the case of an exception which is first received by the interrupt process controller 8, the contents of register 84 are set into register 85 and the contents of register 86 are set into register 87 unconditionally. In another case, the register 85 may already contain an exception element number and the register 87 may already contain an exception instruction address of exception, which have been detected earlier, and the contents of the registers 84 and 85 are compared by the comparator 90 and the contents of registers 86 and 87 are compared by the comparator 91. If the exception element number in register 84 for the newly received exception is smaller than the previous one in register 85, the signal line 92 goes to "1" and OR gate 93 is enabled to provide an output. If the exception element number of the newly received exception is equal to the previous one and, at the same time, if the exception instruction address in 86 of the newly received exception is earlier than the previous one, AND gate 94 is enabled to output "1" and then the OR gate 93 is also enabled to provide an output. The output of the OR gate 93 causes the register 84 to set its contents into the register 85, and the register 86 to set its contents into the register 87.

In this way, the interrupt process controller 8 receives exception detect signals from the pipeline arithmetic units for after another and selects an exception with the smallest vector element number and the earliest instruction address based on the comparison with those of the previously detected exception, whereby exception information of the selected exception, such as the exception element number, exception instruction address and interrupt code (not shown), is held in the vector processing apparatus performing a computation for vectors with more elements than the vector register can store. The operation of the exception information selecting circuit operable solely in single processing mode is shown in FIG. 3.

Figure 4:
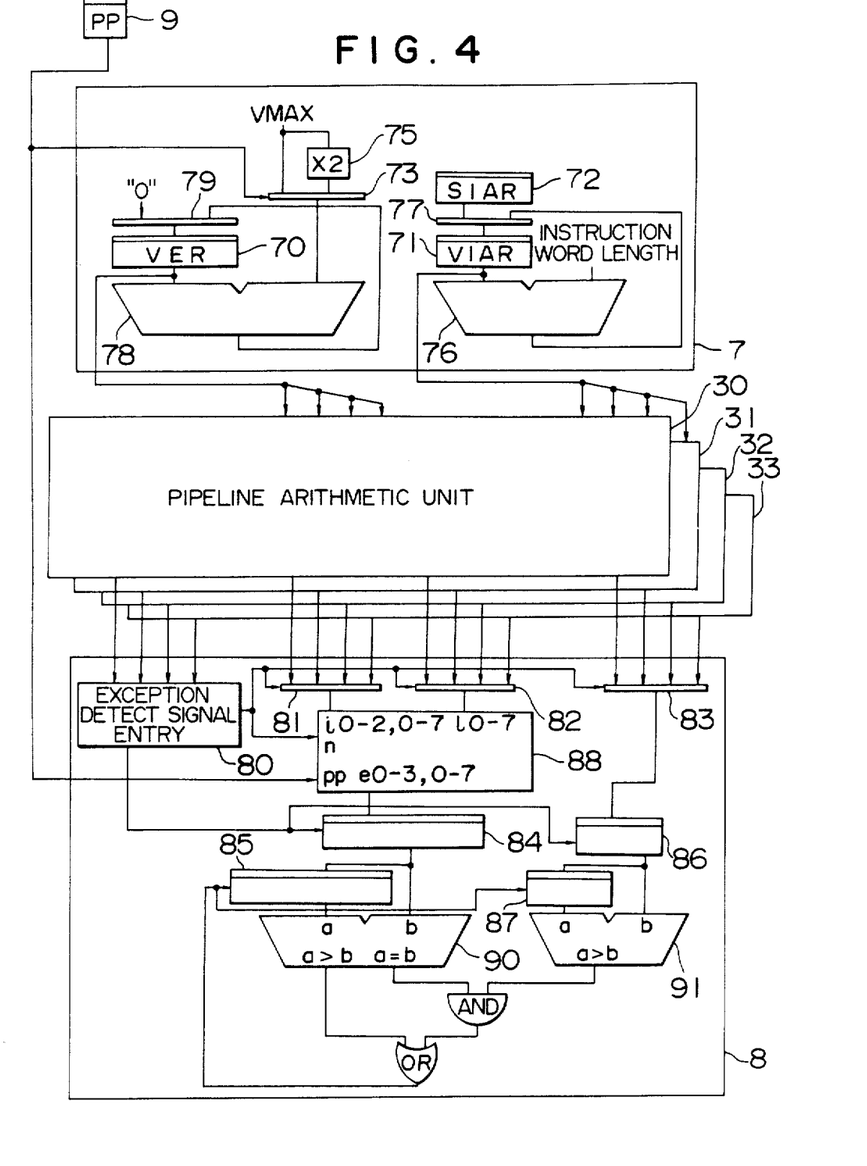
FIG. 4 is a block diagram showing the exception information selecting circuit in a parallel processing mode.

Next, the operation of an exception information selecting circuit which is operable in both the single and parallel processing modes will be described with reference to FIG. 4. The arrangement of FIG. 4 differs from that of FIG. 3 in that a selector 73 is provided for switching the count-up value of the processed vector element count register 70 in response to the state of the mode flag flip-flop 9, and in that an exception element number generating circuit 88 is provided for obtaining the exception vector element number given to the register 84, whereas in the arrangement of FIG. 3 this value is obtained by simply adding the outputs of the selectors 81 and 82. Details of the exception element generating circuit 88 will be described later with reference to FIG. 5. The remaining portions of both arrangements of FIGS. 3 and 4 are the same.

When the mode flag flip-flop 9 is reset to "0", indicating the single processing mode, the selector 73 selects VMAX as the count-up value for VER and the exception element number generating circuit 88 operates as an adder for adding the outputs of the selectors 81 and 82, and therefore the arrangement works identically to the previous embodiment of FIG. 3. When the mode flag flip-flop 9 is set to "1", indicating the parallel processing mode, the selector 73 selects the output of the doubling circuit 75 which doubles VMAX, and the exception element number generating circuit 88 operates to modify the vector register address indicated by the pipeline arithmetic units 30–33 and to add it to the leading vector element number, whereby an exception with the smallest vector element number and the earliest address can be selected, as in the case of single processing mode.

Figure 2C:
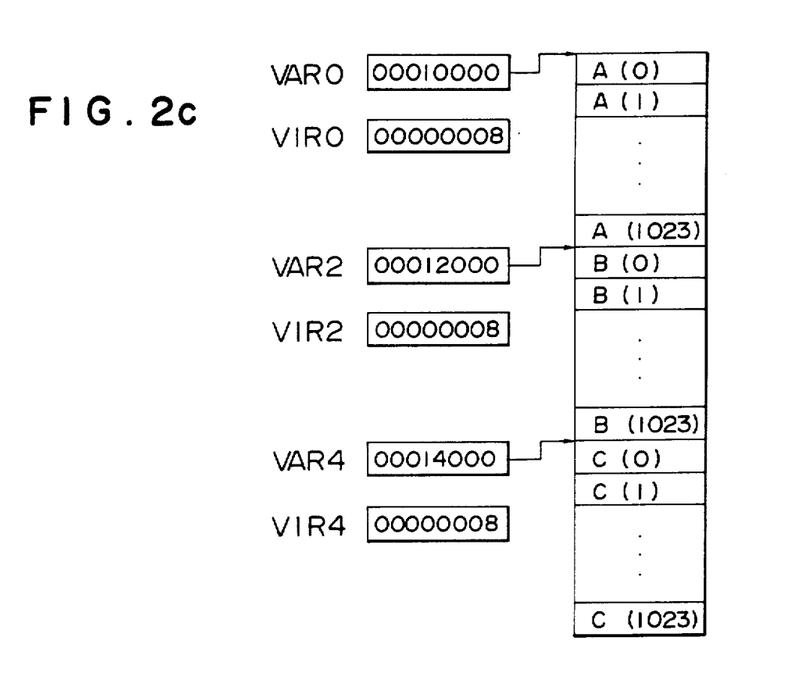
FIG. 2c is a description showing vector data in the main storage corresponding to the vector instructions shown in FIG. 2b.

The operation specific to the parallel processing mode will be described in the following. In the parallel processing mode, as mentioned previously in connection with FIG. 2, a vector instruction is processed by a pair of pipeline arithmetic units in such a way that one is assigned to even-numbered elements and the other assigned to odd-numbered elements, and therefore vector elements of VMAX×2 in number at most are processed in one loop. Accordingly, by summing the contents of the processed vector element count register 70 for VMAX×2 times each time the VEND instruction is decoded, the leading vector element number of the vector instruction initiated in one loop can be obtained. The pipeline arithmetic units do not directly access the main storage, and they operate irrespective of the processing mode to indicate to the interrupt process controller 8 the vector register address of a vector element at which exception has been detected. The interrupt process controller 8 discriminates as to whether the pipeline arithmetic unit which has detected an exception is assigned to process evennumbered or odd-numbered elements, and operates on the exception element number generating circuit 88 to add the vector register address multiplied by two in the case of even-numbered elements, or multiplied by two and incremented by one in the case of odd-numbered elements to the leading vector element number, and to set the result into the exception element number register 84.

Figure 5:
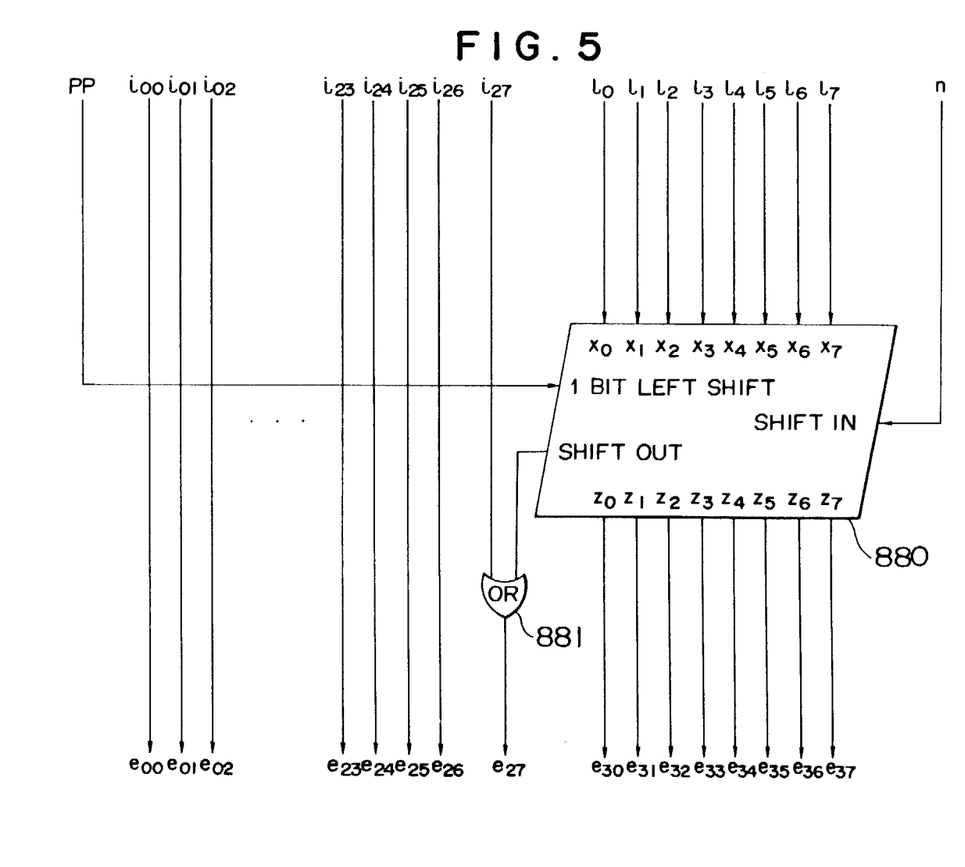
FIG. 5 is a schematic diagram showing in detail the exception element number generating circuit shown in FIG. 4.

The following describes in detail the exception element number generating circuit 88 for a particular case of the exception element number register 85 having 4-byte length and the vector register length being VMAX=256, as shown in FIG. 5. Symbols pp, n, i0–2, 0–7, l0–7, e0–3, and 0–7 shown in FIG. 5 correspond to those in the exception element number generating circuit 88. The lowest byte of the 4-byte leading element number to be stacked by each pipeline arithmetic unit is always zero, and each unit issues only the high order three bytes (i0–2, 0–7) as the leading element number. Another one byte (l0–7) is needed for indicating the vector register address. The signal pp indicates the processing mode, and the signal line n carries the signal indicating that a pipeline arithmetic unit is assigned to odd-numbered elements. Addition of the leading element number and the vector register address in the single processing mode is realized by simply merging i0–2, 0–7 into l0–7. At this time, the shifter 880 receives pp=0, and the shift operation does not take place.

Generation of the exception element number in the parallel processing mode is carried out in combination with the operation of doubling the vector register internal address indicated by a pipeline arithmetic unit, the operation of adding one to the doubled result in the case of an odd-numbered element, and the operation of adding the result to the leading element number. These operations are carried out using the shifter 880 and OR gate 881. Namely, in order to modify (duplication and addition by 1) the vector register internal address indicated by a pipeline arithmetic unit, the shifter 880 is arranged for the case of pp=1 such that:

Shift out . . . x0
z0–z6 . . . x1–x7
z7 . . . Shift in

For the addition of the modified vector register internal address to the leading element number, the shifter 880 is constructed to provide outputs e30–e37 and, based on i27=0 always in parallel processing mode, an OR gate 881 is provided to obtain e27. Thus, the exception element number generating circuit 88 for the case of VMAX=256 can be realized by a relatively simple circuit arrangement as shown in FIG. 5.

According to the present invention, an exception which has occurred first conceptually in dealing with vector elements can readily be selected without impairing the performance of vector instruction execution, whereby information on an exception comparable with the result of the conventional scalar processing apparatus can be offered to the software system.

I claim:

1. A vector processing apparatus having vector registers and a plurality of functional facilities capable of operating concurrently and intended to process vectors having a larger number of vector elements than a vector register has the capacity to store, each functional facility having means for detecting an exception relating to its operation, said apparatus comprising: means for holding information in correspondence to each of said functional facilities, including the address of an instruction under process by that functional facility, leading vector element position information for a vector element to be processed by said instruction and a vector register internal address of a vector element at which an exception has been detected by said functional facility; and means for reading out the information in said holding means in response to a signal indicating detection of an exception from any functional facility and for selecting information corresponding to one of said functional facilities in accordance with a predetermined rule.

2. A vector processing apparatus according to claim 1, wherein said functional facilities comprise pipeline arithmetic units.

3. A vector processing apparatus according to claim 2, wherein said holding means comprises means for holding the address of an instruction and leading vector element position information in correspondence to arithmetic stages of said pipeline arithmetic unit.

4. A vector processing apparatus according to claim 3, wherein said exception includes at least one of an access exception and an arithmetic exception.

5. A vector processing apparatus according to claim 1, wherein said reading out means includes means for selecting that information received from said holding means which includes the smallest vector element number for an instruction having the earliest address.

* * * * *